(12) United States Patent
Goodstein

(10) Patent No.: US 6,302,440 B1
(45) Date of Patent: Oct. 16, 2001

(54) GOLF CART SCREEN

(76) Inventor: Ronald Goodstein, 256 Eagle Dance Cir., Palm Desert, CA (US) 92211

( * ) Notice: Subject to any disclaimer, the term of this patent is extended or adjusted under 35 U.S.C. 154(b) by 0 days.

(21) Appl. No.: 09/490,900

(22) Filed: Jan. 25, 2000

(51) Int. Cl.[7] ................................. B60R 11/00
(52) U.S. Cl. ........................... 280/762; 280/DIG. 5; 296/96.11
(58) Field of Search ............... 280/762, DIG. 5; 180/908; 296/86, 96.11, 96.2, 97.21, 77.1; 160/90

(56) References Cited

U.S. PATENT DOCUMENTS

| | | |
|---|---|---|
| 1,339,527 | 5/1920 | Sperling et al. . |
| 1,487,151 * | 3/1924 | Dixon .................. 296/96.11 |
| 2,012,871 * | 8/1935 | Featherston .......... 296/96.11 |
| 4,819,979 * | 4/1989 | Moglia ................. 296/77.1 |
| 5,217,275 | 6/1993 | Ridge . |
| 5,244,443 * | 9/1993 | Cerda .................. 296/77.1 |
| 5,385,379 * | 1/1995 | Heavner ............... 296/77.1 |
| 5,429,404 | 7/1995 | King, Sr. . |
| 5,529,369 | 6/1996 | Welborn . |
| 5,688,018 | 11/1997 | Simpson . |
| 5,901,768 * | 5/1999 | Herbst ................. 160/90 |
| 5,921,609 | 7/1999 | Mills et al. . |

FOREIGN PATENT DOCUMENTS

| | | | | |
|---|---|---|---|---|
| 2614268 * | 10/1988 | (FR) | ...... | 296/77.1 |
| 2-189289 * | 7/1990 | (JP) | ...... | 280/DIG. 5 |

* cited by examiner

*Primary Examiner*—Frank Vanaman
(74) *Attorney, Agent, or Firm*—Knobbe, Martens, Olson & Bear, LLP

(57) ABSTRACT

A wind screen for a golf cart. The wind screen is comprised of a frame which defines an opening and screen material is attached to the frame so as to fill the opening. The screen material is selected so as to allow air to travel therethrough while inhibiting the passage of bugs, dust and debris. The wind screen is adapted to be positioned adjacent a windshield of the golf cart such that the passengers in the golf cart can be cooled by air travelling through the wind screen but not have dirt, debris or insects hitting the passengers in the face. In one embodiment, the wind screen is attached to the golf cart through the use of hook and loop fastener material.

8 Claims, 3 Drawing Sheets

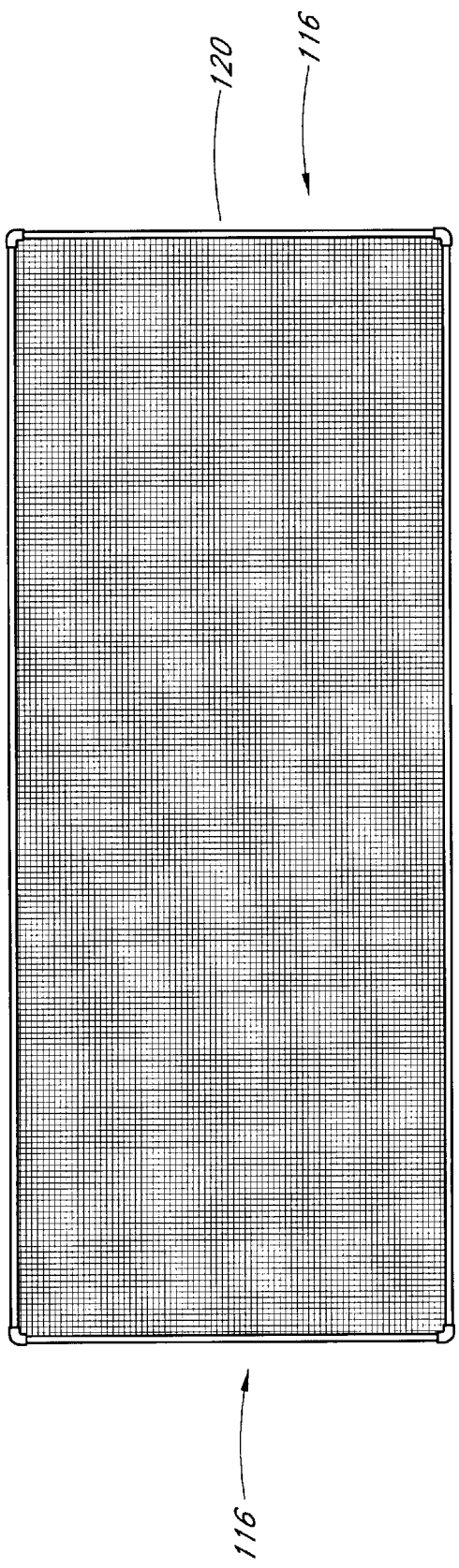
FIG. 3A
FIG. 3B

GOLF CART SCREEN

BACKGROUND OF THE INVENTION

1. Field of the Invention

The present invention relates to debris screening devices and, more particularly, to a removable, diaphanous screen assembly and attachment provision for golf carts and the like.

2. Description of the Related Art

Golf is a recreational activity enjoyed by millions of people around the world. Golf is an outdoor activity and involves moving around on cut grass fields. Many golf courses are located in areas with moderate to warm average temperatures and often have trees and ponds as part of the landscaping. Golfers enjoy being outdoors and being exposed to the sun and pleasant weather conditions.

Golf requires the use of a set of golf clubs and other accouterments that in aggregate are fairly heavy. To avoid the burden of carrying the club set and other accessories around by hand, many golfers use small wheeled vehicles called golf carts to carry themselves and their equipment around the golf course. The use of a golf cart also opens up the pleasures of golf to individuals who might not otherwise be capable of walking around the golf course and carrying their equipment because of physical infirmity or advancing age.

As the vehicles are driven outdoors in varying weather conditions, the vehicle and occupants are exposed to potentially inclement weather. The vehicle and occupants are also exposed to any ambient wind that may exist as well as the relative air motion induced when the vehicle is underway. The vehicle and occupants are also exposed to flying insects, falling leaves, and other airborne debris. These insects and other debris are a constant irritant and could enter the occupants' mouths or impact and injure their eyes. In addition, the distraction to the driver from unimpeded airborne objects could result in an accident.

In order to protect the occupants from wind and weather intrusion and airborne debris while in motion, a typical golf cart is fitted with a windshield assembly. This windshield is typically a glass or transparent plastic assembly placed in front of the passenger compartment. The windshield typically extends the full width and height of the forward side of the passenger compartment, providing total coverage for the driver and any passengers. The windshield assembly is hinged at the bottom to allow the user to fold the windshield forward. This allows the users to lower the windshield and feel the wind in their face as they drive the cart.

However, this type of windshield has several drawbacks. With the typical windshield assembly the user has two options for use: fold the screen completely forward or fold it up and secure it. The drawback to using a golf cart with the windshield folded forward is that, while permitting unrestricted airflow, such use offers the driver and passenger no protection from flying debris or insects. The drawback to using the golf cart with the windshield in the upright position is that, while shielding the occupants from wind, weather, and debris intrusion, the windshield blocks all airflow from the forward direction. While safer, the golfers' pleasurable experience of feeling the breeze as they drive is precluded with the windshield in the upright position. While there may have been some attempt to form windshield devices that allow some airflow through while inhibiting entry of particulates and insects, these devices have generally been relatively ineffective and obtrusive in appearance.

Hence, there is a need for a golf cart screen that both permits air to flow through to thereby cool the occupants while still keeping bugs and particles away from the occupants' faces. To this end, there is a need for an easily retrofitted assembly that can accomplish these objectives which can be installed in a simple manner that does not affect the overall appearance of the golf cart or inhibit proper operation of the existing windshield.

SUMMARY OF THE INVENTION

The aforementioned needs are satisfied by the golf cart screen of the present invention which, in a first aspect, is an assembly for preventing particles and insects from entering the occupant compartment of a golf cart having a front windshield which defines a windshield area. The assembly comprises a frame having a first and a second side member and a top and a bottom member. The top and the bottom members interconnect the first and second side members such that the first and second side members and the top and bottom member together define an opening. The assembly also comprises a screen having a plurality of openings formed therein wherein the screen is attached to the frame so as to extend across the opening. The plurality of openings in the screen are sized so as to permit air to flow therethrough while preventing particles and insects from travelling through the opening in the frame. The assembly also includes an attachment mechanism connected to the frame so as to permit the frame to be mounted adjacent the wind shield of the golf cart to thereby inhibit particles and insects from travelling through the wind shield area of the golf cart into the faces of the occupants of the golf cart.

In one embodiment, the screen attaches to the golf cart by first adhering one or more strips of hook and loop fastener to the screen frame and adjacent the windshield area of the golf cart. The screen assembly is then placed adjacent the windshield area of the golf cart such that corresponding strips of the hook and loop fastener mate together. The screen assembly is removed from the golf cart by grasping the frame and pulling. The screen assembly can be sized and positioned so as to shield the occupants' faces from object intrusion, yet still allow some unimpeded airflow around the periphery of the screen.

It will be appreciated that the golf cart screen effectively protects the occupants from insect and debris intrusion while allowing a comfortable flow of air to reach the occupants. The golf cart screen provides for convenient attachment to and removal from the golf cart, through the use of readily available and easily used hook and loop fastener. The screen may be readily retrofitted to existing golf carts and does not require elaborate tools or techniques for installation. The screen minimally impacts the overall appearance of the golf cart, because of its slim profile and integration into the existing frame of a golf cart. The screen can be mounted to the interior of the window frame posts such that the screen does not interfere with the normal use of the windshield, as the existing windshield may still be placed in either of its normal use positions. These and other objects and advantages will become more fully apparent from the following description taken in conjunction with the accompanying drawings.

BRIEF DESCRIPTION OF THE DRAWINGS

FIG. 3A shows a top or front view of the assembled golf cart screen of FIG. 1;

FIG. 3B shows a side or edge-on view of the golf cart screen of FIG. 1; and

DETAILED DESCRIPTION OF THE PREFERRED EMBODIMENT

Figure 1A:
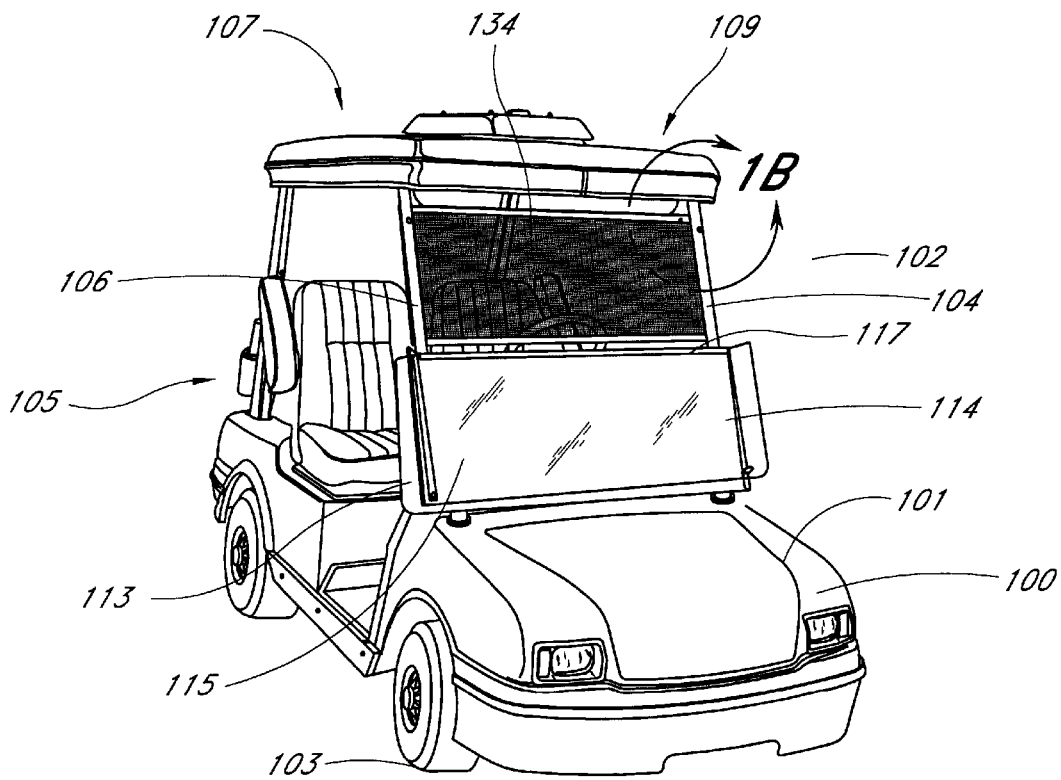
FIG. 1A shows a typical installation of the golf cart screen of the preferred embodiment on a golf cart.

Reference will now be made to the drawings wherein like numerals refer to like parts throughout. Referring to FIG. 1A, a golf cart 100 is shown in a perspective view.

The golf cart 100 is a typical prior art wheeled, powered vehicle that allows golfers to travel about a golf course without walking. In particular, the golf cart 100 includes a body 101 that houses a motor (not shown). The body 101 is attached to wheels 103 to permit rolling motion of the golf cart 100 over the ground. The golf cart 100 also defines a passenger area 105 which is shaded by a canopy assembly 107. The front face 109 of the canopy assembly 107 defines a windshield area 102 through which air can flow into the passenger compartment 105 during movement of the golf cart 100.

The golf cart 100 comprises a left canopy upright 104 that interconnects the body 101 of the golf cart 100 to the canopy assembly 107. The left canopy upright 104 is located in the windshield area 102 and is generally rectangular in shape and is formed from closed metal channel that is generally square in cross-section. The left canopy upright 104 serves as a mounting surface for the wind screen of the preferred embodiment as will be described in greater detail below.

The golf cart 100 also comprises a right canopy upright 106 that interconnects the body 101 of the golf cart 100 to the canopy assembly 107 in the windshield area 102. The right canopy upright 106 is also located in the windshield area 102 and is generally rectangular in shape and is formed from a closed metal channel that is generally square in cross-section. The right canopy upright 106 also serves as a mounting surface for the wind screen of the preferred embodiment as described in greater detail below.

The left canopy upright 104 and the right canopy upright 106 together define the outer lateral edges of the windshield area 102. The windshield area 102 is, in this embodiment, an opening that is rectangular in shape and is defined by the interstitial space between the left canopy upright 104 and the right canopy upright 106, the golf cart body 101 and the canopy assembly 107. The windshield area 102 defines the area of the golf cart 100 into which the golf cart screen 120 of the preferred embodiment is fitted.

The golf cart 100 also comprises a hinged windshield 114. The hinged windshield 114 is rectangular in shape and is made of a transparent glass or plastic material. The hinged windshield 114 is provided with a fixed section 113 and a movable section 115 with a hinge 117 interposed between the fixed section 113 and the hinged section 115. The movable section 115 of the windshield 114 can be rotated upwards so as to occupy the windshield area 102 and is secured in this position in a well-known manner or folded downwards or away from the windshield area 102. The hinged windshield 114 serves to shield the occupants of the golf cart 100 from wind, weather, and flying debris.

A golf cart screen 120 of the present invention is shown in FIG. 1A. The golf cart screen 120 is rectangular in shape and comprises a frame 122 and a screen material 134 positioned within the frame to be described in greater detail below. The golf cart screen 120 attaches to the golf cart 100 in the windshield area 102 as shown in FIG. 1A. The method of attachment will be described in greater detail below. The golf cart screen 120 serves to protect the occupants of the golf cart 100 from airborne objects.

Figure 1B:
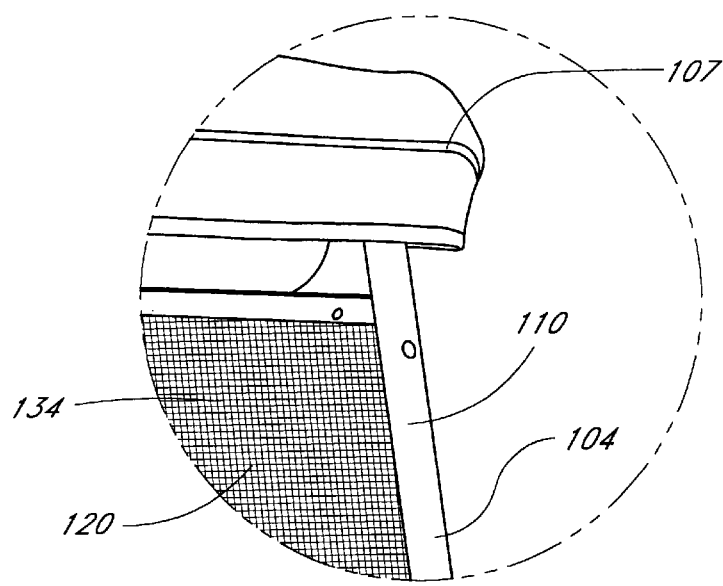
FIG. 1B shows a close up view of the attachment of the golf cart screen of FIG. 1 to a golf cart and, in particular, how the golf cart screen is mounted in relation to the canopy frame of the cart.

FIG. 1B shows in greater detail the relationship between the golf cart 100 and the golf cart screen 120. FIG. 1B shows a close up view of the left canopy upright 104. The left canopy upright 104 has an outer surface 110 as shown in FIG. 1B. It can be seen with reference to FIG. 1A and FIG. 1B that the hinged windshield 114 would contact the outer surface 110 of the left canopy upright 104 when the hinged windshield 114 is rotated to its upright position. The golf cart screen 120 is preferably mounted to the inner surface of the canopy uprights 104, 106 so as to not inhibit movement of the windshield 114.

Figure 2:
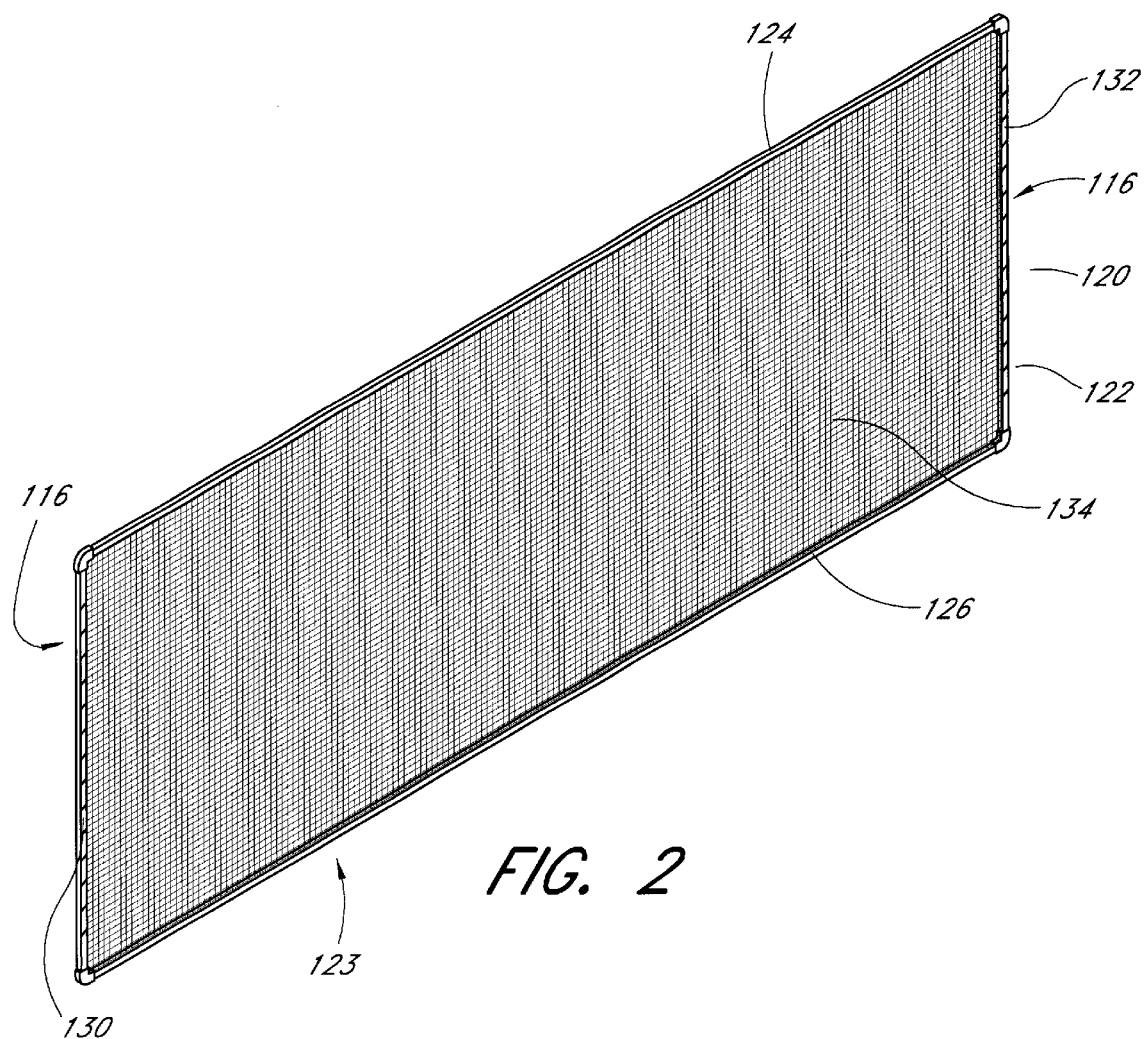
FIG. 2 shows a perspective view of the assembled golf cart screen of FIG. 1.

FIGS. 2, 3A and 3B illustrate the golf cart screen 120 in more detail. The golf cart screen 120 comprises a frame 122. The frame 122 is rectangular and approximately 40"×16"× ¼" in dimensions. The frame 122 comprises a top member 124, a bottom member 126, a left side member 130, and a right side member 132. The top member 124, bottom member 126, left side member 130, and right side member 132 are rectangular and in the preferred embodiment are formed from light metal channel, such as aluminum. The top member 124, bottom member 126, left side member 130, and right side member 132 are interconnected to form the frame 122, which defines an opening 123, in a manner well known to those skilled in the art.

The golf cart screen 120 also includes a screen material 134 that is captured within the opening 123 defined by the frame 122. The screen material 134 is a diaphanous membrane with a plurality of openings, such as the typical window screen material known in the art. The openings are sized so as to prevent passage through the openings of insects and other particles. The screen material is approximately 40"×16" in dimension with enough additional material to allow attachment to the frame 122 in a manner well known to those skilled in the art.

Figure 4:
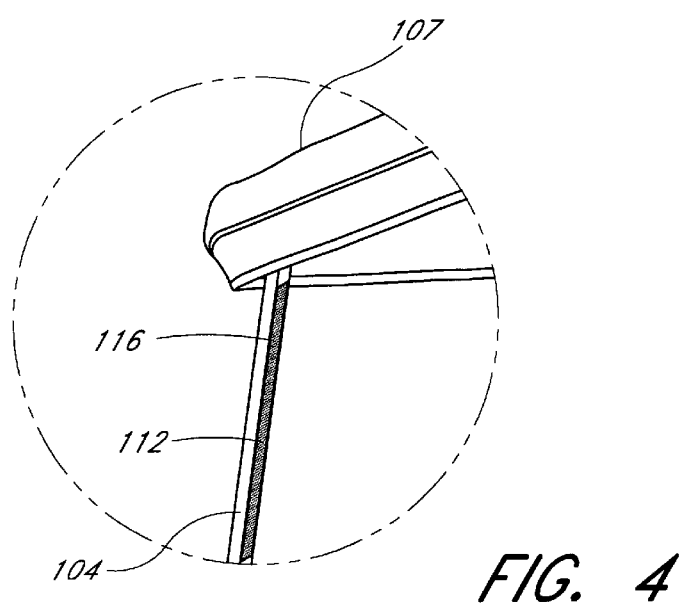
FIG. 4 shows a close up perspective view of the manner of the preferred embodiment in which the golf cart screen of FIG. 1 attaches to the golf cart.

FIG. 4 shows a close up view of the left canopy upright 104 and the method of attaching the golf cart screen 120 to the golf cart 100. It can be seen with reference to FIG. 4 that the left canopy upright 104 has an inner surface 112 opposite the outer surface 110 shown in FIG. 1B. In the preferred embodiment of the present invention, hook and loop fastener 116 is attached along an approximately 16" length of the inner surface 112 of the left canopy upright 104. Similarly, hook and loop fastener 116 is attached to the inner surface 112 of the right canopy upright 106.

In the preferred embodiment of the present invention, the mating pieces of the hook and loop fastener 116 attached to the inner surface 112 of the left canopy upright 104 and the right canopy upright 106 are attached along the approximately 16" length of the left side member 130 and the right side member 132 of the frame 122. The mating pieces of the hook and loop fastener 116 must be placed on the left side member 130 and the right side member 132 such that both pieces of hook and loop fastener 116 are on the same side of the frame 122.

To attach the golf cart screen 120 to the golf cart 100 the golf cart screen 120 is moved into the windshield area 102 in such a way that the orientation of the golf cart screen 120 matches the windshield area 102. The golf cart screen 120 must also be oriented such that the hook and loop fastener 116 attached to the golf cart screen 120 is adjacent the inner surface 112 of the left canopy upright 104 and the right canopy upright 106. To effect the attachment, the golf cart screen 120 must be brought into physical contact with the inner surface 112 of the left canopy upright 104 and the right canopy upright 106 such that the mating pieces of the hook and loop fastener 116 adhere to each other.

It can be seen that the golf cart screen 120 is easily retrofitted onto a golf cart 100 through the use of hook and loop fastener 116. The hook and loop fastener 116 requires no tools or special skill to apply as it is readily available in self adhesive strips that only need to be cut to the desired size and adhered in place. The golf cart screen is easily installed and removed as it attaches with hook and loop fastener 116 that requires no tools and is reusable. While hook and loop fasteners are used in this embodiment of the invention, it will be appreciated that other fasteners can also be used without departing from the spirit of the present invention.

The golf cart screen does not interfere with the normal use of the hinged windshield 114 as the golf cart screen 120 attaches to the inner surface 112 of the windshield area 102 and does not contact the hinged windshield 114 when the hinged windshield 114 is either of its normal positions. The golf cart screen 120 is unobtrusive in use as the frame 122 conforms to the existing left canopy upright 104 and the right canopy upright 106. Also the screen material 134 used is of a diaphanous nature. The screen material 134, when assembled into the golf cart screen 120 effectively prevents the passage of insects and other debris due to the small size of the openings in the screen material 134. It can also be appreciated that due to the openings in the screen material 134 air is able to pass through the golf cart screen 120 and also provides the driver of the vehicle with an unobstructed view. Thus the golf cart screen 120 protects the occupants of a golf cart 100 from insects and other airborne debris, yet still allows air to pass freely into the golf cart 100.

Although the foregoing description of the preferred embodiment of the present invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. A golf cart comprising:
   a chassis wherein the chassis defines a passenger compartment adapted to receive one or more occupants;
   a plurality of wheels attached to the chassis so as to permit movement of the chassis;
   a front wind shield having a front opening that permits air to flow into the passenger compartment when the golf cart is in motion;
   a wind screen having a planar frame attached to the golf cart so as to be immediately adjacent the front opening of the front wind shield defining an opening and a screen positioned about the opening defined by the frame, wherein the screen defines a plurality of openings sized so as to permit air to flow through the screen while inhibiting particles and insects from travelling through the opening in the frame into the passenger compartment of the golf cart; and
   a canopy assembly having a first and second vertical support each having an outer an and inner surface that are attached to the chassis adjacent a first side of the passenger compartment wherein the planar frame of the wind screen is directly attached to the inner surface of the first and second vertical supports so as to position the wind screen immediately adjacent the inner side of the opening to thereby permit mounting of the windscreen without interfering with the windshield.

2. The golf cart of claim 1, wherein the frame is dimensioned so as to be smaller than the front opening of the front wind shield such that air can flow around the wind screen into the passenger compartment of the golf cart.

3. The golf cart of claim 2, wherein the wind screen is attached to the golf cart so as to be positioned in the front opening at a location selected to be in front of the faces of the occupants of the golf cart.

4. The golf cart of claim 1, wherein the front wind shield is attached to the outer surface of the first and second vertical support.

5. The golf cart of claim 4, wherein the front wind shield has a fixed piece fixedly mounted to the chassis and a hingably connected piece that can be moved between an open position wherein the front opening is exposed and a closed position wherein the front opening is occupied by the hinged piece of the wind shield.

6. The golf cart of claim 5, wherein the wind screen is attached to the inner surface of the first and second vertical supports so as to be positioned in the opening such that the positioning of the wind screen in the opening does not interfere with movement of the hinged piece of the wind shield between the open and closed position.

7. The golf cart of claim 6, wherein the wind screen is attached to the golf cart through hook and loop fastener material positioned on the wind screen and the inner surfaces of the first and second vertical supports.

8. The golf cart of claim 1, wherein the wind screen is comprised of a frame that defines an opening and a screen material that defines the plurality of openings.

* * * * *